United States Patent
Frost et al.

(10) Patent No.: US 9,950,396 B2
(45) Date of Patent: Apr. 24, 2018

(54) METHOD AND APPARATUS FOR REPAIRING CONVEYOR CHAIN

(71) Applicant: Frost Tech LLC, Grand Rapids, MI (US)

(72) Inventors: Charles C. Frost, Ada, MI (US); Charles J. Deschaine, Walker, MI (US); Keith Miller, Hudsonville, MI (US)

(73) Assignee: Frost Tech LLC, Grand Rapids, MI (US)

( * ) Notice: Subject to any disclaimer, the term of this patent is extended or adjusted under 35 U.S.C. 154(b) by 339 days.

(21) Appl. No.: 14/732,535

(22) Filed: Jun. 5, 2015

(65) Prior Publication Data

US 2016/0354876 A1    Dec. 8, 2016

(51) Int. Cl.
*B23P 6/00*    (2006.01)
(52) U.S. Cl.
CPC ........... *B23P 6/00* (2013.01); *Y10T 29/49723* (2015.01)

(58) Field of Classification Search
CPC ..... B23P 6/00; Y10T 29/49723; B65G 17/38; B21D 39/048
See application file for complete search history.

(56) References Cited

U.S. PATENT DOCUMENTS

| | | | |
|---|---|---|---|
| 7,726,469 B2 | 6/2010 | Frost et al. | |
| 2011/0016843 A1* | 1/2011 | Scott | B21L 9/065 59/7 |

* cited by examiner

*Primary Examiner* — Jermie Cozart
(74) *Attorney, Agent, or Firm* — Mitchell Intellectual Property Law, PLLC (57) ABSTRACT

A method and apparatus for repairing overhead conveyor chain by removing a section of track, locating a mobile repair station under the exposed track, and effecting the needed repair on the chain by cycling the intact chain past the mobile repair station and repairing it as it passes. Repair embodiments include re-swaging and repair, replacement or rotation of chain links.

12 Claims, 10 Drawing Sheets

METHOD AND APPARATUS FOR REPAIRING CONVEYOR CHAIN

FIELD OF THE INVENTION

The present invention relates to the field of repairing overhead conveyor chains

BACKGROUND OF THE INVENTION

Overhead conveyor chains are used in numerous manufacturing and processing industries. They comprise links joined by link pins, and include bearing wheels which ride on supporting tracks. They may extend for several hundred to several thousand feet. A typical cost of a new chain is $60 per foot. Accordingly, manufacturers and processors like to maintain the useful life of a chain as much as possible. 14 years is a typical chain life.

One limiting factor on chain life is loosening of the swage connection of the bearing wheel axel to the inner race of the bearing wheel on either side of a chain link. This requires replacement of the affected wheels. Another limiting factor is wear on the link pins, which eventually have to be replaced.

Chains suffering from link pin wear are often repaired by using a "come along" secured at its opposite ends to spaced portions on the conveyor chain. The "come along" is tightened against the take up force applied to the chain. This loosens the chain between the come along securing points, allowing the removal and replacement of worn parts.

Where extensive repairs are required, the entire chain may be removed from its track. Worn pins, wheels or other components are removed and replaced with new counterparts. The cost to remove and either repair or replace chain is significant, e.g. $10-$12 per foot. The process typically takes 24 hours, 12 hours to remove, and 12 hours or more to repair or replace with a new chain, and if repaired, 12 hours more to replace the repaired chain. In addition, 36 hours of production down time means 36 hours of lost profit.

SUMMARY OF THE INVENTION

The present invention comprises a method and apparatus for repairing overhead conveyor chain by removing a section of track, locating a mobile repair station under the exposed chain, and effecting the needed repair on the chain by cycling the intact chain past the mobile repair station and repairing it as it passes. As a result of this invention, a chain can be repaired at about 20% of the cost of removing an old chain and replacing it with a new chain, and can be accomplished in about ⅓ of the time it takes to remove and replace an old chain.

These and other aspects, advantages and features of the invention will be more fully understood and appreciated by reference to the written description of the preferred embodiments and appended drawings.

DESCRIPTION OF THE PREFERRED EMBODIMENTS

Figure 1:
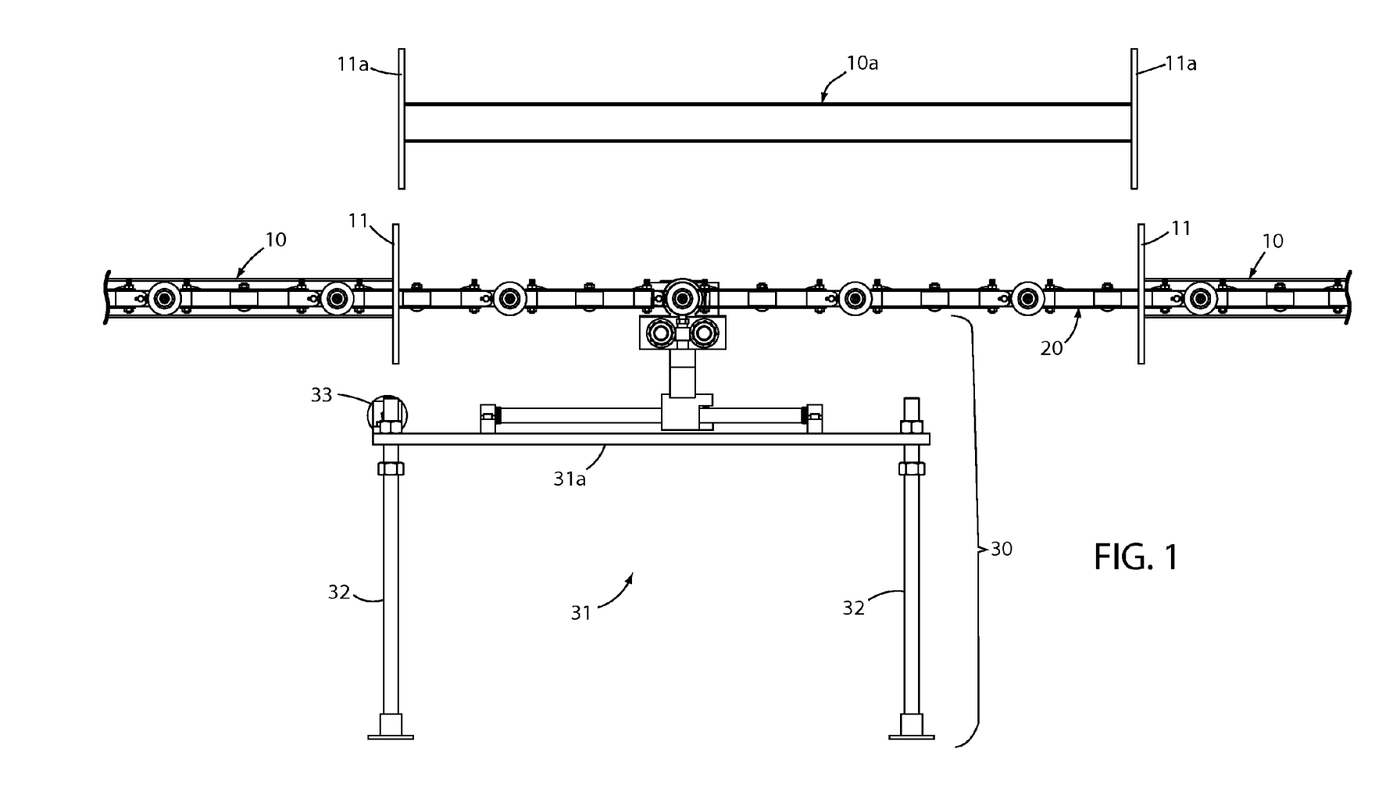
FIG. 1 is an elevation of a portion of a conveyor chain moving along its track, with a section of track removed and a repair station positioned underneath the unsupported section of chain.

In the preferred embodiments, a section 10*a* of conveyor track 10 is removed, leaving a section of conveyor chain 20 exposed (FIG. 1). A repair table 30 is placed under chain 20 where track section 10*a* has been removed. The chain is cycled passed repair table 30 and repaired, without having to remove the chain from track 10. The "components list" (Table 1) sets forth the various components and their identifying numbers which will be described in further detail:

TABLE 1

| Components List | |
|---|---|
| Conveyor track | 10 |
|    Conveyor track section | 10a |
| Coveyor chain | 20 |
|    Center link | 21 |
|    Side links | 22 |
|    Link pins | 23 |
|    Link pin mounting extension | 24 |
|    Guide wheels | 25 |
|    Load wheels | 26 |
|       Axel | 26a |
|       Inner race | 26b |
|       Outer race | 26c |
|       Bearings | 26d |
|       Swaging detent | 26e |
| Mobile Repair Station | 30 |
|    Repair table | 31 |
|       Table work surface | 31a |
|       Telescoping legs | 32 |
|       Roller | 33 |
|    Mobile supports | 34 |
|       Base | 34a |
|       Wheels | 34b |
|       Telescoping legs | 34c |
|       Top platform | 34d |
|       Locator blocks | 34e |
| Swage repair unit | 40 |
|    Slides | 41 |
|    Slide end blocks | 41a |
|    Swage platform | 42 |
|    Mounting bracket | 43 |
|       Punch mounting band | 43a |
|       Anvil mounting band | 43b |
|    Chain track | 44 |
|    End plates | 45 |
|    Tie bars | 46 |
|    nuts | 47 |
|    Punch unit | 50 |
|       Punch cylinder | 51 |

TABLE 1-continued

Components List

| | | |
|---|---|---|
| | Punch piston | 52 |
| | Punch insert | 53 |
| | Punch tip | 53a |
| | Wheel capture sleeve | 54 |
| | End portion | 54a |
| Anvil unit | | 60 |
| | Anvil plate | 61 |
| | Anvil insert | 61a |
| | Anvil projection | 61b |
| | Mounting plate | 62 |
| | Anvil base | 63 |
| | Push pins | 64 |
| | Push pin springs | 65 |
| Pin repair unit | | 70 |
| | Chain support channel | 71 |
| | Funneled end | 71a |
| | Bottom slot | 72 |
| | Bottom opening | 73 |
| | Chain clamps | 75 |

The tracks used in overhead conveyor systems have various configurations. Track 10 shown herein is of an I-beam configuration, with each section having a flange 11 which is bolted to the flange 11 of the next adjacent track section (FIG. 1). Typically, the track sections are 5-10 feet in length.

Figure 2:
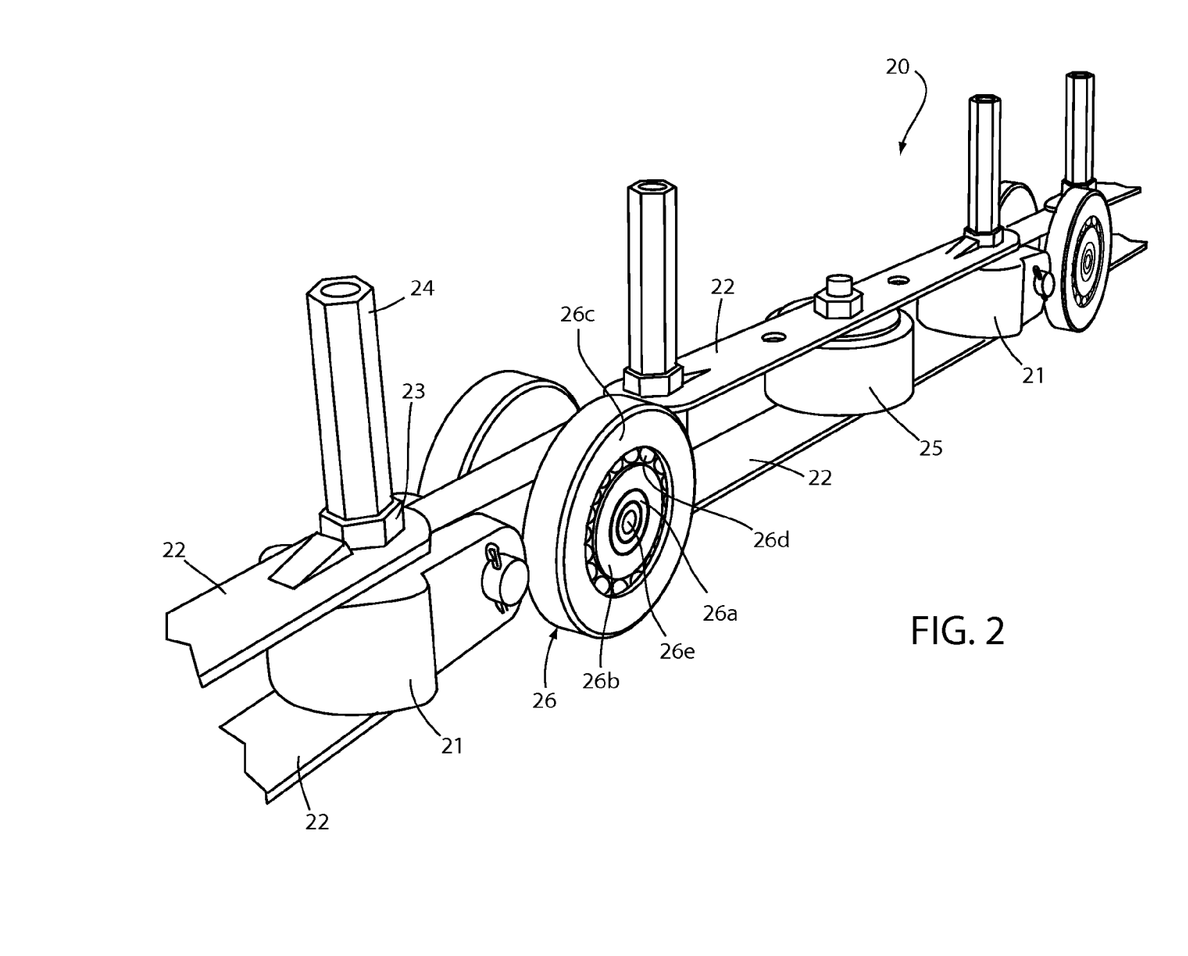
FIG. 2 is an enlarged perspective view of a small section of conveyor chain.

Conveyor chains come in various configurations as well. The particular conveyor chain illustrated in the present embodiments comprises a plurality of center links 21 joined to adjacent side links 22 by means of link pins 23 (FIG. 2). The link pins 23 shown in these embodiments include upstanding mounts 24 for mounting other items, such as supporting platforms for conveyed articles. A wheel 26 is positioned on each side of a center link 21, with an axle 26a passing through each of the load bearing wheels 26 and through center link 21. In chain 20 shown in the present embodiments, a horizontally oriented guide wheel 25 is positioned between each pair of opposed side links 22.

Each load bearing wheel 26 comprises a center axle 26a, an inner race 26b carried on axle 26a, an outer race 26c, and a plurality of bearing rollers or balls 26d carried between the races. The outer rim of wheel 26 is mounted on outer race 26c. The inner races 26b are swaged to axle 26a by pressing the hub ends of the axle between a punch and an anvil. The punch creates a small indentation 26e on one hub end of axle 26a, as shown in FIG. 2.

Over time, the swaged connection between axel 26a and inner race 26b can become loosened, creating wear between inner race 26b and axle 26a, and ultimately leading to disintegration of the wheel. Similarly as noted above, the link pins 23 become worn through engagement with the center links 21 and their adjacent side links 22, and require replacement from time to time. The wear life of link pins 23 can be extended by using repositionable link pins as shown for example in U.S. Pat. No. 7,726,469. These pins can be "repaired" by rotating them between three different positions and three different wear surfaces, as each wear surface has become overly worn.

Figure 3:
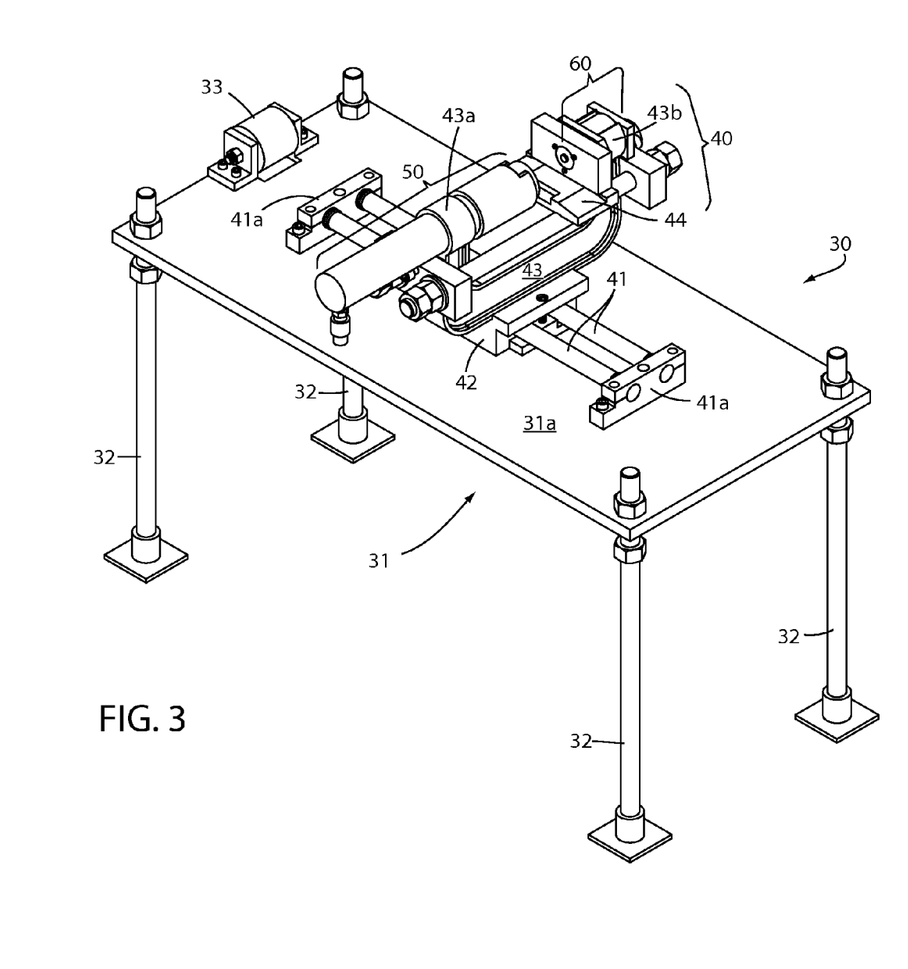
FIG. 3 is an elevated perspective view of a repair station with a swaging unit positioned on the repair table.

Repair station 30 of the preferred embodiment comprises a repair table 31 having a work surface 31a mounted atop telescoping legs 32 (FIG. 3). Legs 32 may optionally be provided with casters or wheels to enhance the mobility of the repair station. A supporting roller 33 is optionally positioned at one or each end of work surface 31. A repair unit, such as swage repair unit 40 shown in FIG. 3 or pin repair unit 70 as shown in FIGS. 10-13, is positioned on top of repair station work surface 31.

Repair station 30 may also comprise spaced mobile supports 34 (FIG. 10), each comprising a base 34a, underlying wheels or casters 34b, upstanding telescoping legs 34c, a top platform 34d and locator blocks 34e. Such spaced mobile supports 34 can be used alone or in conjunction with repair table 31.

Figure 4:
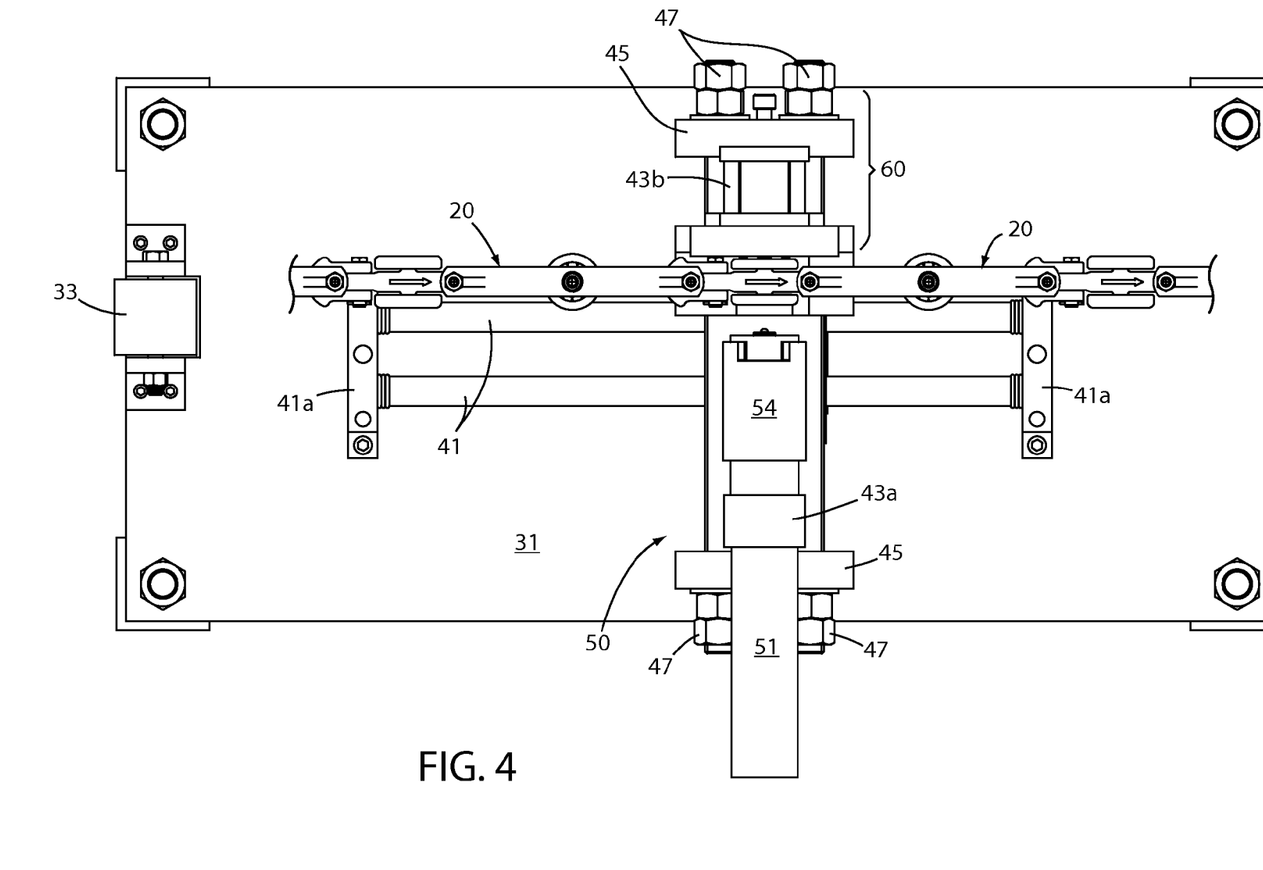
FIG. 4 is a plan view of the repair station of FIG. 3.
Figure 8:
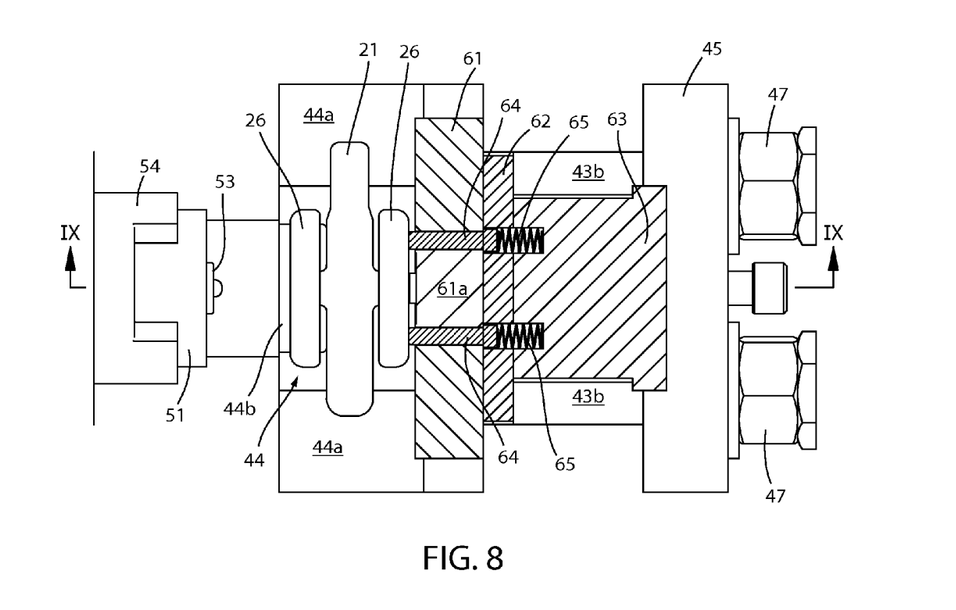
FIG. 8 is a cross sectional view taken along plane VIII-VIII on FIG. 5.
Figure 9:
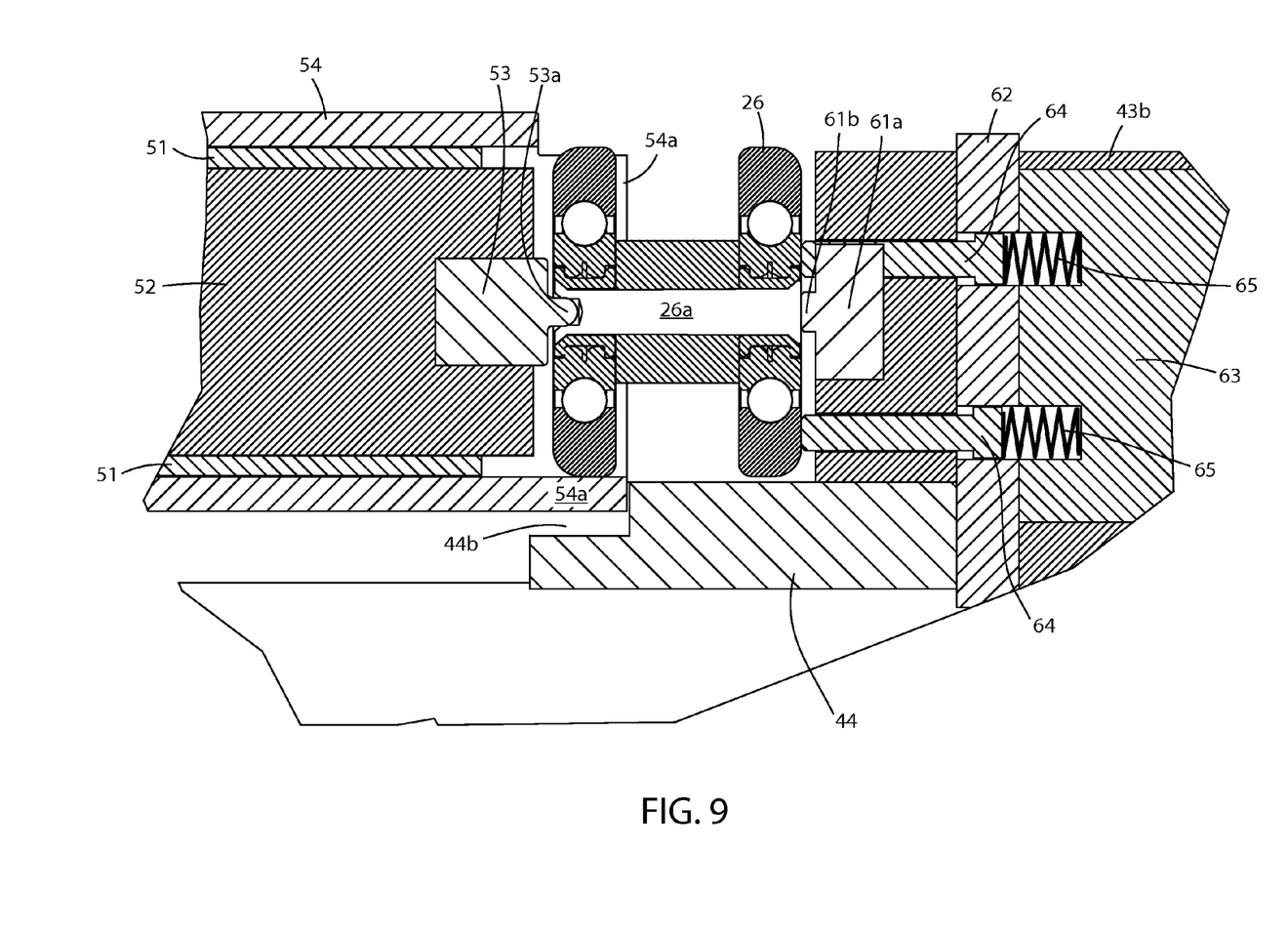
FIG. 9 is a cross sectional view taken along plane IX-IX of FIG. 8.

Swage repair unit 40 comprises a pair of spaced slides 41 mounted between end blocks 41a (FIG. 3). A swage unit mounting platform 42 is slidably carried on slides 41 such that unit 40 can be repositioned along the length of the slides 41. A sturdy upwardly opening "U" shaped mounting bracket 43 is mounted to platform 42. One of the upturned legs of bracket 43 terminates in a sturdy circular mounting band 43a, which surrounds and firmly holds cylinder 51 of swage punch 50 in place. The opposite upturned leg of bracket 43 terminates in a semi-circular mounting band 43b, which embraces and supports swage anvil unit 60 (FIGS. 3 and 4). A section of track support 44 having sloping end portions 44a (FIGS. 5, 7, 8 and 9) extends from anvil unit 60 into the space between anvil unit 60 and punch unit 50, for supporting chain 20 as it passes by. A depression 44b is formed in track 44 in the space adjacent punch unit 50 (FIGS. 3, 8 and 9). This leaves the punch side wheel 26 unsupported and free for capture by the end portion 54a of capture sleeve 54 (FIGS. 5, 8 and 9).

Figure 5:
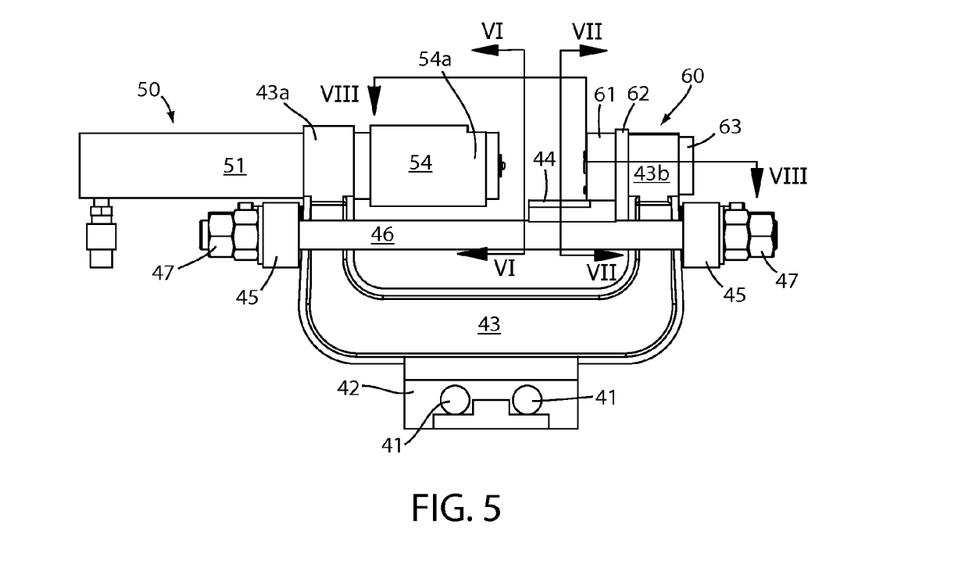
FIG. 5 is an enlarged side elevational view of the re-swaging unit.
Figure 6:
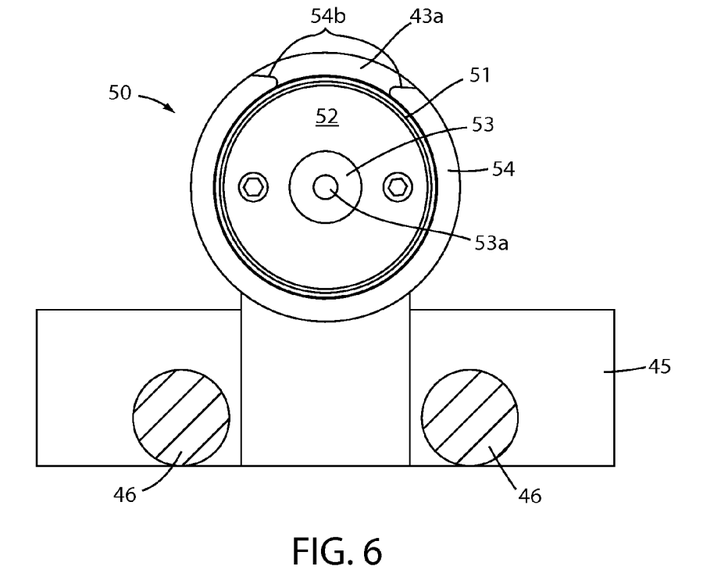
FIG. 6 is a cross sectional view taken along plane VI-VI of FIG. 5.
Figure 7:
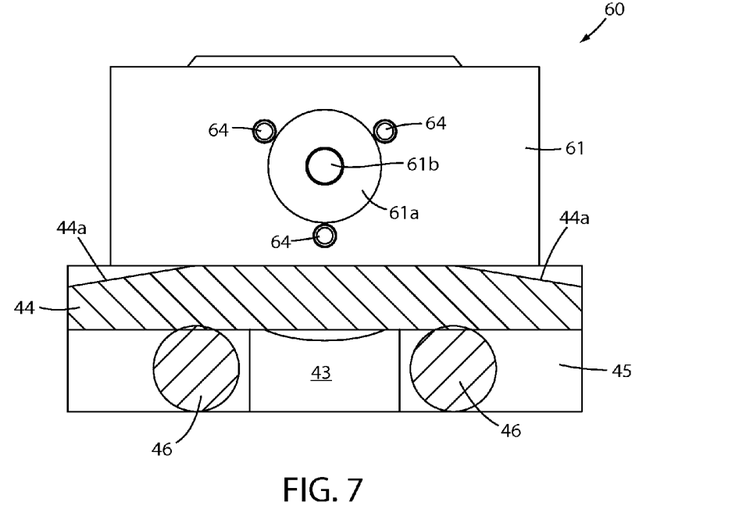
FIG. 7 is a cross sectional view taken along plane VII-VII of FIG. 5.

To help reinforce and hold the punch unit 50 and anvil unit 60 from spreading when punch 50 is activated, end plates 45 are mounted on the upturned legs of bracket 43, and are held against spreading movement by tie bars 46 passing through and between them, and secured in place by nuts 47 on either end of tie bars 46 (FIGS. 4, 5 and 7).

Swaging punch unit 50 comprises a punch cylinder 51 which contains a piston 52 having a punch insert 53 mounted in the end thereof (FIGS. 5, 6, 8 and 9). Punch insert 53 includes a projecting tip 53a which actually does the swaging work of punch unit 50. Punch unit 50 also includes a sliding wheel locating sleeve 54 which can be manually slid along the outside of punch cylinder 51 and into position with its end portion 54a capturing a load bearing wheel 26, as shown in FIG. 9.

Anvil unit 60 comprises a cylindrically shaped anvil base 63 (FIGS. 5, 7, 8 and 9), which is mounted in, and is securely held in place, by the semi-circular anvil mounting band 43b, which comprises the upper end of one of the upstanding legs of mounting bracket 43. This anchors anvil unit 60 in its place.

A mounting plate 62 abuts and is secured to the face of anvil base 63. Anvil plate 61 abuts and is secured to mounting plate 62 (FIGS. 5, 7, 8 and 9). Mounting plate 62 extends down below anvil plate 61 and provides a mount for chain track 44 (FIG. 5). Chain track 44 is mounted to and projects from the face of mounting plate 62. It is also mounted to the bottom of anvil plate 61, which it passes beneath.

Anvil insert 61a is positioned in anvil plate 61 (FIGS. 7, 8 and 9). Anvil insert 61a includes a circular projection 61b which actually engages the hub end of a wheel axel 26a during the re-swaging operation. Projection 61b projects slightly beyond the face of anvil insert 61a and anvil plate 61, such that it projects into the slight recess in the center outside face of wheel 26, where the hub end of wheel axel 26a is located. It also helps keep a small space between anvil plate 61 and wheel 26 during the re-swaging "punch," minimizing the possibility of damage to wheel 26 (FIG. 9).

Spaced push pins 64 are slideably positioned in a bore which passes through anvil plate 61, mounting plate 62, and into anvil base 63 (FIGS. 7, 8 AND 9). The bore is slightly large in diameter in mounting plate 62 and anvil base 63, so as to accommodate the enlarged "hat" end of push pins 64. Pins 64 are biased outwardly by springs 65 positioned behind them, such that they project out from the face of anvil plate 61, and extend slightly into the space above chain track 64. The enlarged hat ends on pins 64 keep them from being pushed out too far, or altogether.

In operation, track section 10a is removed and repair station 30 with swaging unit 40 attached is positioned beneath the now exposed section of chain 20. Repair station 40 is located such that chain 20 rests on chain support track 44 of swage repair unit 40, between swaging punch 50 and swaging anvil 60 (FIGS. 4, 8 and 9). A wheel 26 to be re-swaged is approximately located by moving chain 20. Wheel 26 can be more precisely positioned in re-swaging position by sliding swage repair unit 40 back or forth along slides 41 (FIGS. 3, 4).

With a wheel 26 located directly between swaging punch 50 and swaging anvil 60, wheel locating sleeve 54 is slid forward on cylinder 51 until its end portion 54a captures wheel 26 and holds it in place as shown in FIG. 9. The end portion 54a of sleeve 54 is cut away at 54b, such that it is easier for an operator to see that wheel 26 is properly located as sleeve 54 is slid forward over wheel 26. The projecting anvil push pins 64 help keep wheels 26 and center link 21 properly aligned as one of the wheels 26 is captured by wheel capturing sleeve 54. Once a link 21 and its opposed wheels 26 are thus located (FIG. 8), punch piston 52 is driven forward so that punch tip 53a strikes hard against the hub end of axle 26a. This forces the opposite end of axle 26a hard against anvil projection 61b, and forces push pins 46 inwardly such that wheel 26 is hard against the end of anvil projection 61b (FIG. 9). The projecting portions of said anvil and said punch which engage the opposite ends of an axel to be re-swaged, project far enough out from said punch and said anvil that the surrounding portions of said anvil and said punch do not compress the wheel being repaired except at said axel to be swaged.

This re-swages axle 26 to the inner races 26b of wheels 26. With the wheels 26 thus reswaged, piston 52 withdraws and push pins 64 push wheel 26 away from anvil projection 61b. Chain 20 is then advanced until the next set of wheels 26 are located approximately between anvil unit 60 and punch unit 53, and the operation afore described is repeated.

Figure 10:
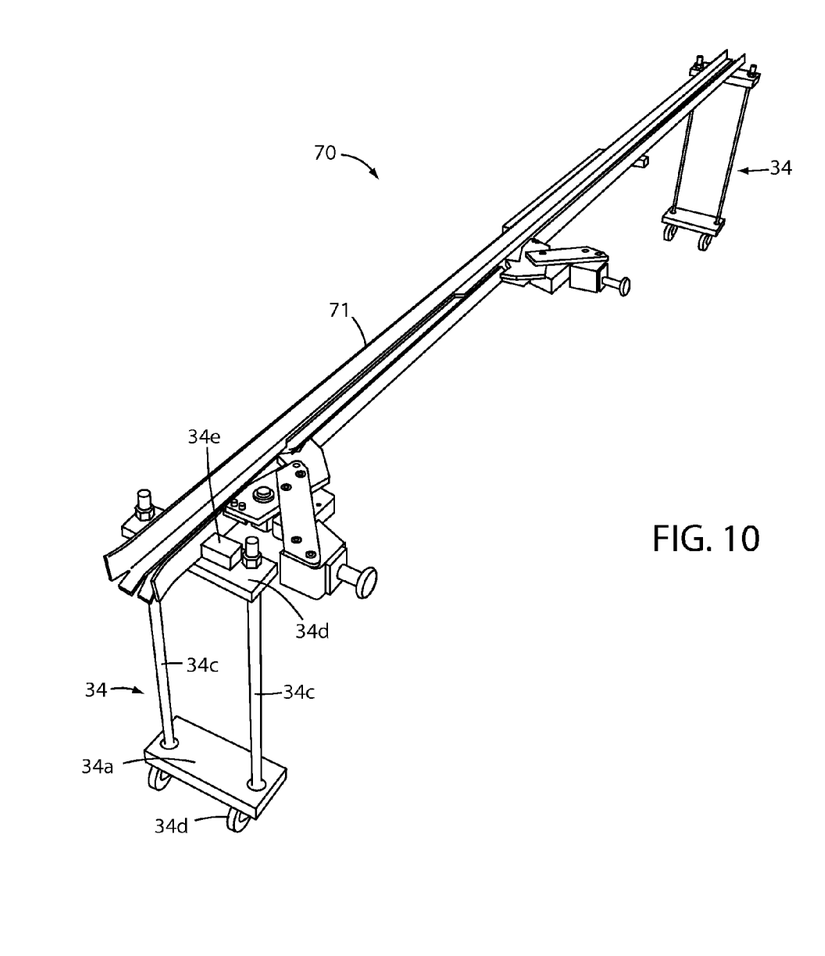
FIG. 10 is a perspective view of a link repair station.
Figure 11:
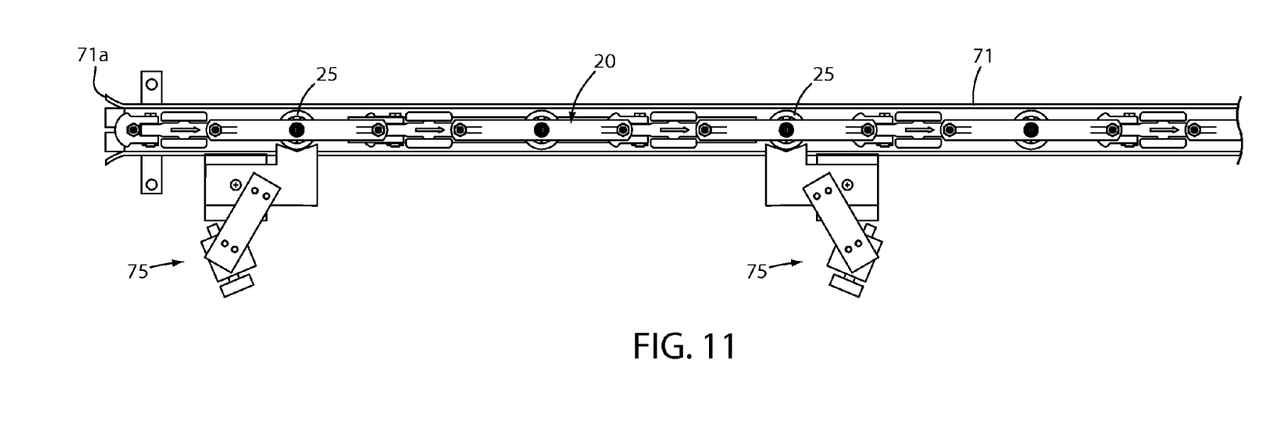
FIG. 11 is a top plan view of a portion of a link repair station with a conveyor chain passing through the repair station.
Figure 12:
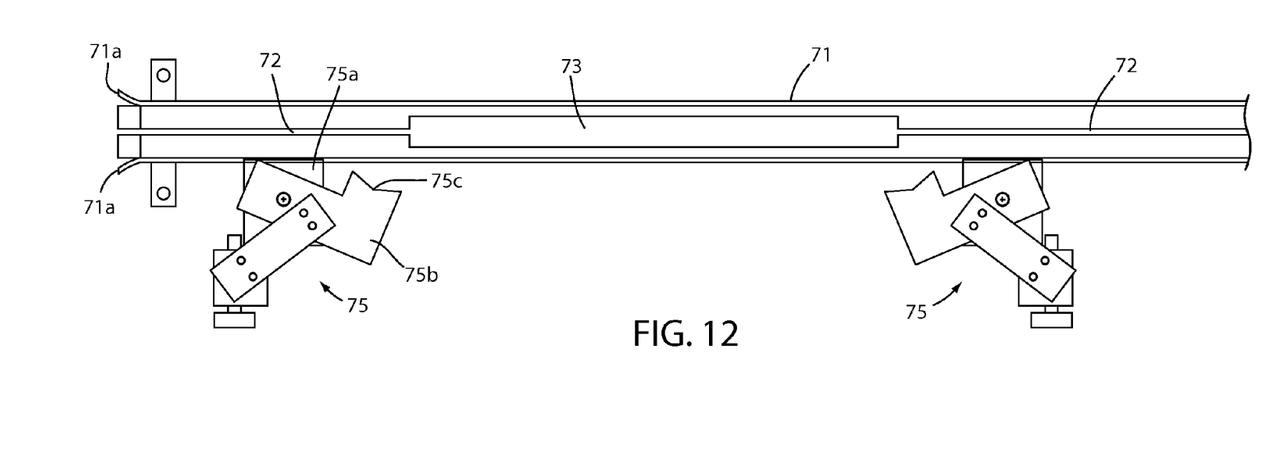
FIG. 12 is a top plan view of a portion of the link repair station.
Figure 13:
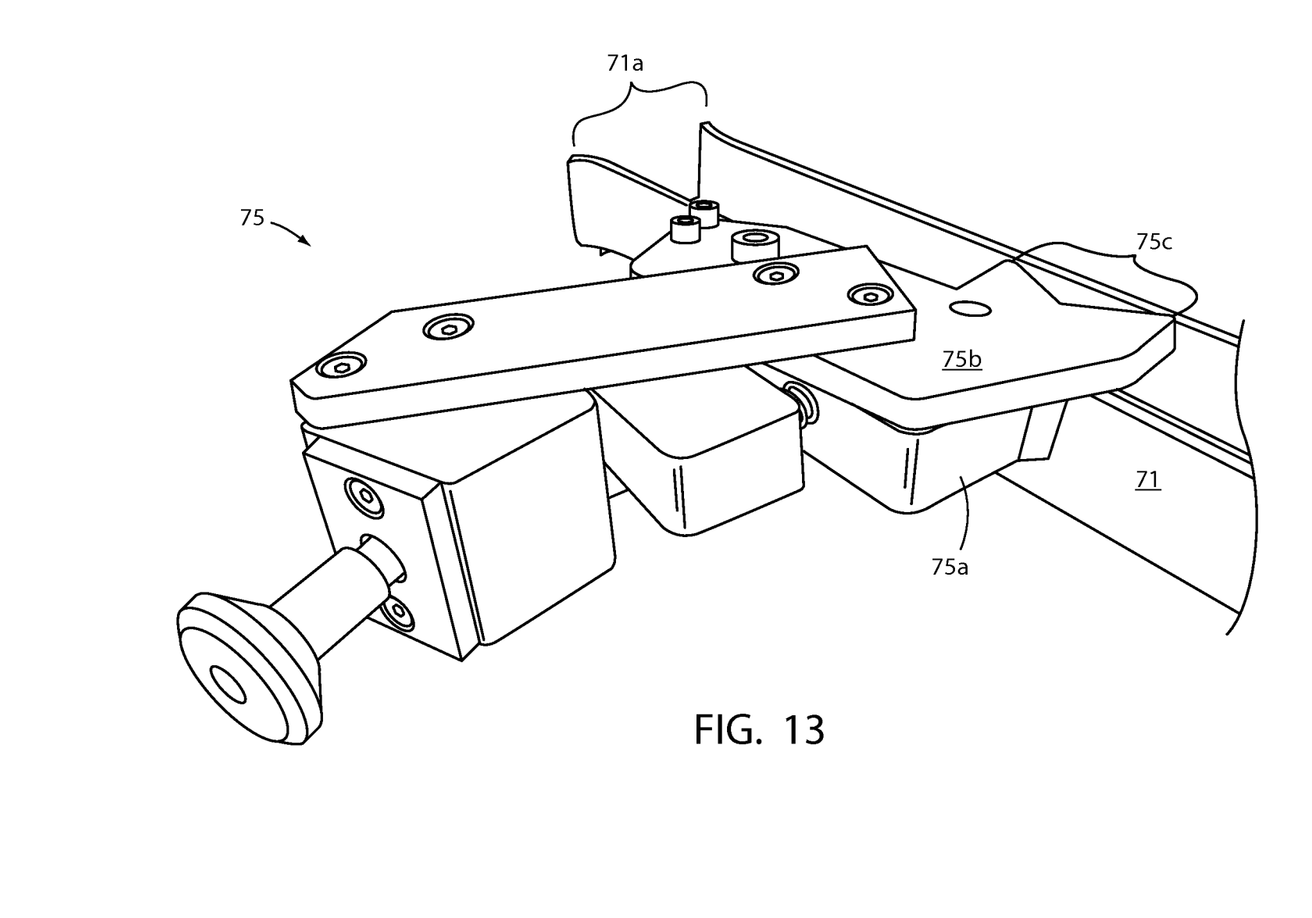
FIG. 13 is a perspective view of a chain clamp of the link repair station.

The pin repair unit 70 comprises an elongated upwardly opening C-shaped channel 71, through which chain 20 passes (FIGS. 10-12). Repair station 70 can be used alone as shown in FIG. 10, or in conjunction with repair table 31. Swaging unit 40 would be removed from table 31, and chain channel 71 would rest on and pass over roller of rollers 33 on repair table 31.

Channel 71 includes an open slot 72 in its bottom wall, through which the heads of pins can pass as chain 20 passes through channel 71. The slots 72 extend from each end and open into an enlarged opening 73 which facilitates greater access to the link pins 23 of chain 20. The end portions 71a of the sidewalls of channel 71 are flared outwardly to define a funneling end which helps feed chain 20 into and out of channel 71 as it passes.

A pair of latches 75 are located generally at each end of the enlarged open area 73 in the bottom of channel 72. A clamping plate 75b is pivotally mounted on a clamp mounting block 75a, which in turn is mounted to the sidewall of track channel 71. When a chain 20 is moved into position for removing or rotating one or more link pins 23 positioned above opening 73, clamps 75 are rotated from their opened position as shown in FIG. 12 to their clamping position as shown in FIG. 11, where the generally V-shaped end 75c of clamping plate 75b engages a guide roller 25 of chain 20. With chain 20 thus locked in place, link pins 23 which are positioned between chain clamps 75 can be removed without losing control of the rest of chain 20.

In use, chain 20 is advanced through channel 71a portion at a time, with each portion covering the distance between clamps 75. Chain 26 is clamped in place by closing clamps 75 as shown in FIG. 11. The link pins between clamps 75 are either rotated to new wear positions or removed and replaced with new pins. The chain is then advanced until another portion of chain 20 which has not yet been serviced is locked in position between clamps 75.

It will be understood that the forgoing is a description of preferred embodiments of the invention, and that various changes and alterations can be made without departing from the spirit of the invention.

The invention claimed is:

1. A method for repairing overhead conveyor chain carried on an overhead track comprising: removing a section of track from said overhead track, thereby leaving a portion of said chain exposed; locating a repair station adjacent said exposed chain; and effecting the needed repairs on the chain by cycling said chain past the mobile repair station and repairing said chain as said chain passes.

2. The method of claim 1 in which said repair station comprises a telescoping base, and said step of locating includes adjusting the height of said repair station such that said repair station is adjacent said exposed chain.

3. The method of claim 1 in which said chain is carried on load bearing wheels as it travels on said overhead track, said load bearing wheels including an inner race fixed to a wheel axle by swaging; said step of locating a repair station includes providing said repair station with a swage repair unit; and said step of effecting repairs comprises re-swaging said connection between said wheel axle and said inner race.

4. The method of claim 3 in which said swage repair unit is provided with an anvil, a punch facing said anvil, and a chain support track positioned between said anvil and said punch; said step of effecting repair including positioning a load bearing wheel on said track between said anvil and said punch, and activating said punch to re-swage said wheel.

5. The method of claim 1 in which said chain includes links joined by link pins; said step of said step of locating a repair station includes providing said repair station with a link pin repair unit; and said step of effecting repairs comprises repairing, replacing or rotating said link pins.

6. The method of claim 1 in which said repair station includes a repair unit mounted on a slide, said slide being oriented parallel to the direction of travel of said chain; said method further including moving said chain such that a portion to be prepared is located approximately at said repair unit: and sliding said repair unit left or right on said slide to more precisely align said repair unit with said portion of said chain to be repaired.

7. The method of claim 1 in which said repair station includes a repair track for supporting chain to be repaired; said step of locating said repair station including positioning said repair track such that said repair track supports said exposed portion of said chain; providing said repair track with an opening which allows access to a portion of said chain to be repaired; and said step of effecting repair of said chain including repairing said chain through said opening in said track.

8. The method of claim 1 in which said repair station includes a repair track for supporting chain to be repaired; said step of locating said repair station including positioning said repair track such that said repair track supports said exposed portion of said chain; providing said repair track with at least two clamps spaced along the length of said track for clamping said chain against movement; said step of effecting repair of said chain including closing said clamps to clamp said chain against movement, and temporarily dismantling and repairing said chain at a location or locations between said clamps.

9. The method of claim 1 in which said chain is carried on load bearing wheels as it travels on said overhead track, said load bearing wheels including an inner race fixed to a wheel axle by swaging; said step of locating a repair station includes providing said repair station with a swage repair unit; said swage repair unit being provided with an anvil, a punch facing said anvil, and a chain support track positioned between said anvil and said punch; said swage unit being mounted on a slide, said slide being oriented parallel to the direction of travel of said chain; said method further including moving said chain such that a portion to be prepared is located approximately at said repair unit: and sliding said repair unit left or right on said slide to more precisely align said anvil and said punch with a load bearing wheel to be repaired; and said step of effecting repairs comprises activating said punch to re-swage said wheel.

10. A method for repairing conveyor chain of the type carried on a supporting track by load bearing wheels which include an inner race fixed to a wheel axle by swaging, said method comprising; re-swaging said wheels when said inner race has become loosened from said wheel axle, by placing a wheel between an anvil and a punch and activating said punch to re-swage said inner race to said wheel axle.

11. The method of claim 10 in which said wheels are affixed to chain links, and are re-swaged while they are still attached to a chain link.

12. The method of claim 11 which includes providing a repair station with a swage repair unit; said swage repair unit being provided with an anvil, a punch facing said anvil, and a chain support track positioned between said anvil and said punch; said re-swaging step including locating a chain link and associated wheel on said chain support track, such that said load bearing wheel is located between said anvil and said punch; and activating said punch to re-swage said wheel.

\* \* \* \* \*